United States Patent [19]

Wisneskie et al.

[11] Patent Number: 5,063,958

[45] Date of Patent: Nov. 12, 1991

[54] BURST DIAPHRAGM SEQUENCE VALVE

[75] Inventors: Bradley D. Wisneskie, Irvine; Sheldon Hyman, Costa Mesa; Charles E. Hallum, Irvine, all of Calif.

[73] Assignee: The United States of Americas as represented by the Secretary of the Navy, Washington, D.C.

[21] Appl. No.: 647,312

[22] Filed: Jan. 24, 1991

[51] Int. Cl.$^5$ .............................................. F16K 17/16
[52] U.S. Cl. .................................... 137/68.1; 220/89.2
[58] Field of Search .................... 137/68.1, 69, 70, 71, 137/72; 431/21; 220/89.1, 89.2

[56] References Cited

U.S. PATENT DOCUMENTS 3,478,761 11/1969 Fox ...................................... 137/68.1
4,207,913 6/1980 Fike, Jr. ........................... 220/89.2 X
4,404,982 9/1983 Ou ....................................... 137/71 X
4,759,460 7/1988 Mozley ........................... 137/68.1 X Primary Examiner—Martin P. Schwadron
Assistant Examiner—Kevin Lee
Attorney, Agent, or Firm—Wayne O. Hadland; Kenneth L. Warsh; Robert Wohlfarth

[57] ABSTRACT

A burst diaphragm sequence valve which effectively combines the structure of a burst diaphragm with that of an ordinary swing check valve, the pivot of the ordinary swing check valve being replaced by an integral flexural hinge. The sequence valve provides a way to sequentially burn solid propellant hot gas generators which exit into a common gas manifold, thereby enabling gas-powered devices to operate for a longer time than the duration of one gas generator burn.

6 Claims, 2 Drawing Sheets

U.S. Patent    Nov. 12, 1991    Sheet 1 of 2    5,063,958
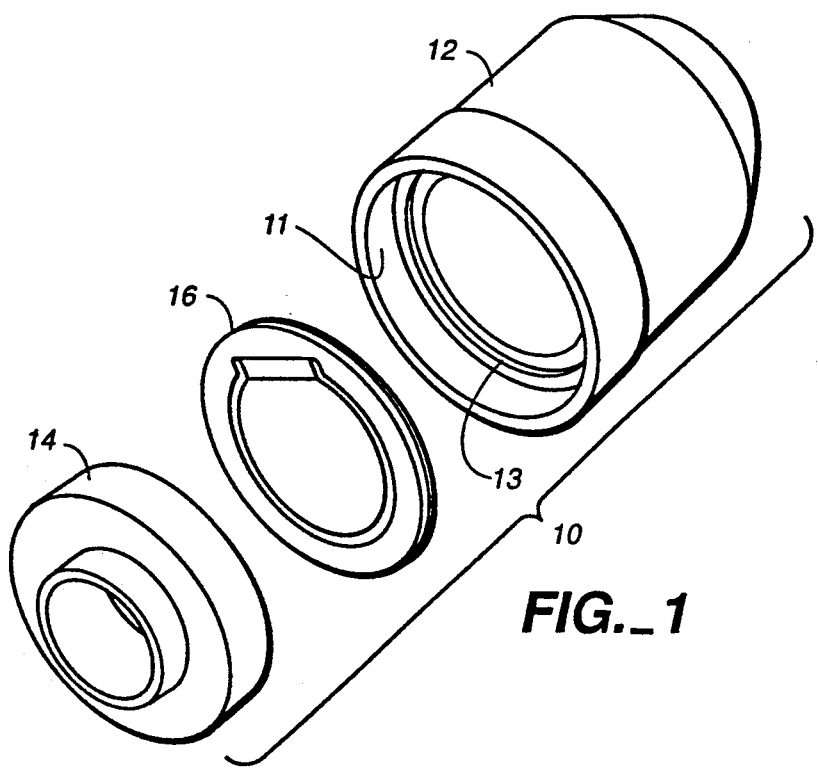
FIG._1
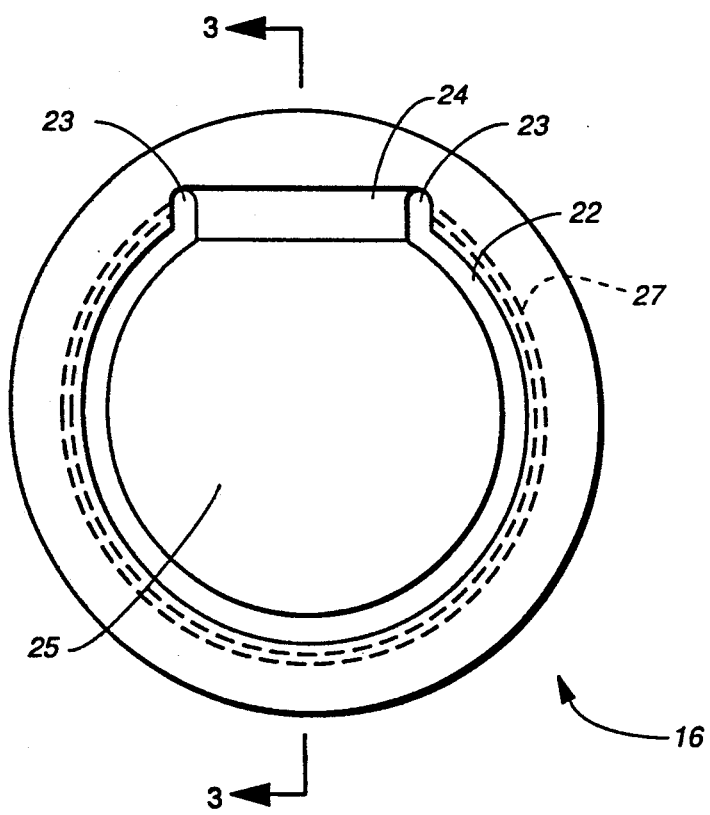
FIG._2
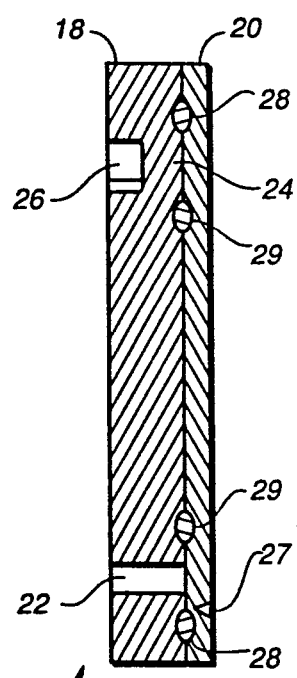
FIG._3

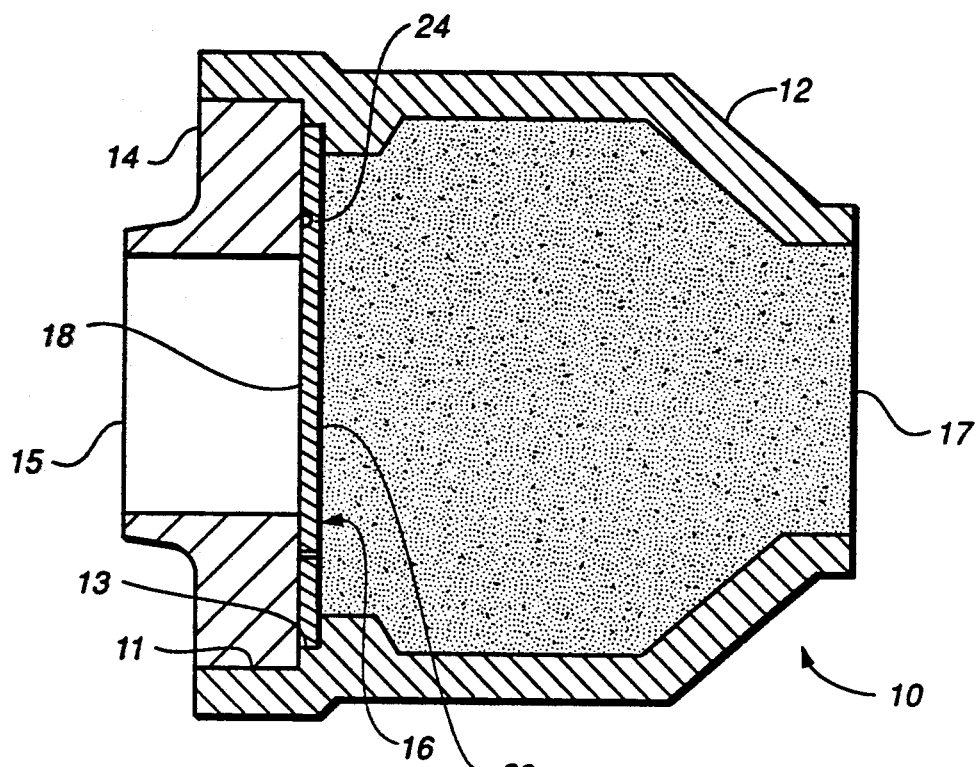
FIG._4
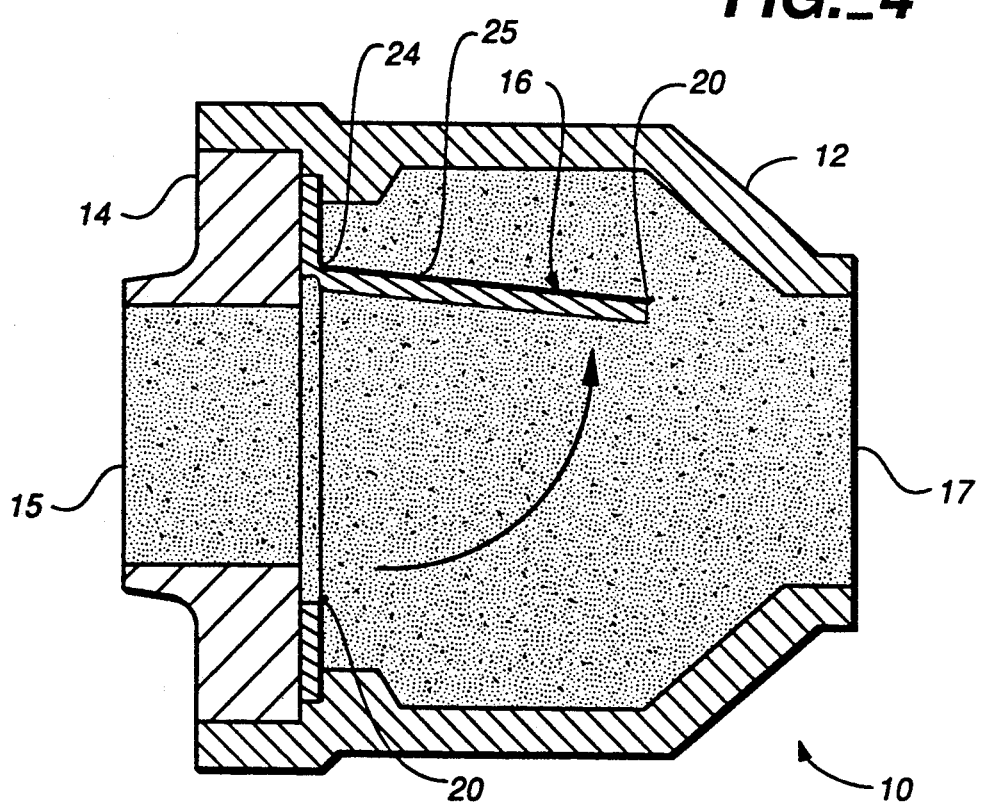
FIG._5

BURST DIAPHRAGM SEQUENCE VALVE

FIELD OF THE INVENTION

The present invention relates to burst diaphragm valves, and more particularly to a burst diaphragm valve that opens only in response to pressure from a single direction and that is suitable for use with high temperature dirty gas such as that emanating from a solid propellant gas generator.

BACKGROUND OF THE INVENTION

The gas emanating from a solid-propellant gas generator, such as those used in aerospace applications, is contaminated by particulates from the solid propellant itself and is usually at high temperature and velocity. A problem inhibiting the sequential use of gas generators exiting into a common gas manifold is that the hot gases produced by the generator first ignited could flow back up the common manifold and ignite other generators prematurely.

Therefore there is a need for a valve that can hermetically seal off a secondary gas generator from hot dirty gases within a common gas manifold, that will open only in response to gas pressure from that secondary (upstream) gas generator, that can accommodate high temperatures, and that will offer minimal flow resistance once open. Additionally it is necessary that the valve be simple and light weight, reliable, unaffected by contamination, and not be susceptible to shattering on opening (which could release fragments downstream causing damage to a gas-powered device).

The present invention solves the problem and satisfies the needs for a practical burst diaphragm sequence valve suitable for solid propellant gas generator applications.

OBJECTS, FEATURES, AND ADVANTAGES

It is an object of the present invention to provide a valve that exhibits a gas-tight hermetic seal until opened.

It is another object of the present invention to provide a valve that will open only in response to pressure from an upstream direction.

It is yet another object of the present invention to provide a valve that will offer little resistance to gas flow once opened.

It is yet still another object of the present invention to provide a burst diaphragm valve that will not shatter and release fragments into the downstream flow when opening.

It is a feature of the present invention to use a burst diaphragm assembly comprised of a (1) thin burst diaphragm scored by a semicircular scribe groove, which is attached by two concentric circles of welds to a (2) thicker back pressure support plate having a generally semicircular slot; the diameter of the slot is smaller than the diameter of the scribe groove, and both the groove and slot lie between the diameters of the inner and outer concentric welds.

It is another feature of the present invention utilize a locally reduced-thickness portion of the back pressure support plate as an integral flexural hinge.

It is an advantage of the present invention that after the thin diaphragm has fractured along the scribe groove it remains firmly attached to the back pressure support plate by the two circles of weld.

It is another advantage of the present invention that vulnerability to contamination is minimized due to an absence of separately moving parts with adjacent rubbing surfaces.

SUMMARY OF THE INVENTION

The burst diaphragm sequence valve of the present invention effectively combines the structure of a burst diaphragm with that of an ordinary swing check valve, the pivot of the ordinary swing check valve being replaced by an integral flexural hinge.

The burst diaphragm sequence valve provides a way for devices powered by solid-propellant-generated hot gas to operate for a longer period of time than the duration of one primary gas generator burn. The present invention enables additional (secondary) solid-propellant gas generators, each one connected to a common gas manifold via a corresponding burst diaphragm sequence valve, to be individually and sequentially burned thereby functioning as if they were a single longer-burning source of hot gas.

The function served by the burst diaphragm sequence valve is to (1) isolate a gas generator to be used later by hermetically sealing it off from the hot dirty gases produced by earlier-burning gas generators (in order to prevent ignition before the time desired), and then after ignition to (2) function as a low-restriction unidirectional burst valve. When it is desired to put an isolated gas generator into operation, the generator is ignited and the gas pressure acting on the upstream side of the sequence valve causes the thin diaphragm within the sequence valve to rupture along a scribe groove line and the central flap portion of the burst diaphragm assembly to then swing outwards, thereby admitting gas from that generator into the manifold.

BRIEF DESCRIPTION OF THE DRAWINGS

FIG. 1 is an exploded perspective view of a burst diaphragm sequence valve assembly.

FIG. 2 is a view (looking in the direction of gas flow) of the burst diaphragm assembly of the sequence valve shown in FIG. 1.

FIG. 3 is a cross-sectional view of the burst diaphragm assembly, taken along line 3—3 in FIG. 2; the thickness is exaggerated in order to illustrate the details of construction.

FIG. 4 is a cross-sectional view of the sequence valve with the burst diaphragm intact (with no gas flowing through the valve), the shaded portion representing gas under static pressure from a downstream operating gas generator pushing in the upstream direction against the burst diaphragm assembly.

FIG. 5 is a cross-sectional view of the sequence valve with the burst diaphragm ruptured and the central flap portion of the burst diaphragm assembly swung fully open, the shaded portion here representing gas under pressure flowing from an upstream operating gas generator. The gas flow is from left to right in this figure.

DESCRIPTION OF THE PREFERRED EMBODIMENT

The general construction of the burst diaphragm sequence valve 10 of the present invention is illustrated in FIGS. 1 through 3. FIG. 1 shows the three main portions of the valve 10; the sequence valve body 12, the inlet cap 14, and the burst diaphragm assembly 16. All parts are welded together to form an assembly that (as shown in FIG. 4) before opening provides a hermetically tight seal against hot gases tending to flow upstream (in FIG. 4 upstream being from outlet 17 on the right toward inlet 15 on the left). All parts of the valve 10 should be made from weldable refractory metal suitable for the specific application, for example molybdenum, tantalum, and columbium.

The valve body 12 is double-counterbored on the upstream end to accept the insertion of the burst diaphragm assembly 16 into the minor counter-bore 13, followed by the insertion of the inlet cap 14 into the major counter-bore 11, as shown in FIGS. 1 and 4.

The details of the two-part burst diaphragm assembly 16 are shown in FIGS. 2 and 3. The thin burst diaphragm 20 is attached to the back pressure support plate 18 by two concentric circles of weld, outer weld circle 28 and inner weld circle 29. These two weld circles serve both to attach diaphragm 20 to plate 18 and to prevent gas from flowing through slot 22 which extends completely through plate 18. Slot 22 has a generally semi-circular configuration and extends over an arc length corresponding to approximately eighty percent of the way around a full circle. A straight recess 26 having a rectangular cross section cuts across the upstream side of plate 18, bridging across the gap between the two ends 23 of generally semi-circular slot 22 and thereby forming a flexural hinge 24 in the reduced-thickness region of plate 18 directly underneath recess 26. The two ends 23 of slot 22 extend outwardly, normal to and across the ends of recess 22. The slot 22 and recess 26 circumscribe and define the central flap portion 25 of the burst diaphragm assembly 16. A semi-circular scribe groove 27 extends partially through the thin burst diaphragm 20, cut into the downstream side of diaphragm 20 (the side facing away from plate 18). The semi-circular scribe groove 27 should lie outside of slot 22 and inside of weld 28, as shown in FIGS. 2 and 3.

The following is a general description of a preferred embodiment of the burst diaphragm sequence valve 10 designed to accommodate a downstream flow of 1650° C. gas from an upstream gas generator having an approximately six minute burn time. The burst diaphragm assembly 16 is designed to resist the static back pressure of gas at temperatures of up to 820° C. and pressures of up to 3.1 MPa (in this situation the back-pressure gas comes from a downstream gas generator also having an approximately six minute burn time). The burst diaphragm assembly 16 is designed to operate (i.e., burst and swing open) when it is within an operating temperature range of from 260° C. to 650° C., and subjected to an operating pressure (i.e., pressure coming from an upstream source tending to push the burst diaphragm assembly toward the downstream direction) of not more than 2.1 MPa. All parts of the sequence valve 10 are made of columbium alloy C-103, consisting of 10% hafnium, 1% titanium, remainder columbium. The thickness of the back pressure support plate 18 is 2.92 mm; the thickness of the thin burst diaphragm 20 is 0.356 mm. The slot 22 through the back pressure support plate 18 is 1.57 mm wide and is centered on a 36.50 mm diameter. The outer circular weld 28 is centered on a 48.26 mm diameter; the inner circular weld 29 is centered on a 28.58 mm diameter; both are made by electron beam welding. The semicircular scribe groove 27 in the thin burst diaphragm 20 is centered on a 41.28 mm diameter. The preferred scribe groove 27 cross-sectional shape is in the shape of a "V" having a sixty degree total included angle, the bottom of the "V" being flat rather than sharp, the width of the flat bottom being thirty percent of the preferred groove depth of two-thirds the diaphragm thickness. The preferred cross-sectional shape of the straight recess 26 in plate 18 is rectangular, in this instance 1.27 mm deep into plate 18 by 3.96 mm wide (having internal corner fillet radii of 0.50 mm); recess 26 is 19.05 mm long, and is centered 16.61 mm from the common center of the welds 28 and 29, slot 22, and groove 27.

In operation a solid-propellant secondary gas generator (not shown) is connected to the upstream inlet 15 of sequence valve 10, and a gas manifold (not shown) is connected to the downstream outlet 17 of sequence valve 10. The gas manifold is generally directly connected to another gas generator (a primary gas generator, not shown) that is ignited and burned first, and the gas manifold is also connected to whatever device (not shown) is to be powered by the hot gases generated. The sequence valve 10 isolates the secondary solid-propellant gas generator from hot gases within the manifold (generated by the primary gas generator) that could otherwise cause it to ignite. After the primary gas generator has been exhausted and the secondary gas generator is ignited, the gas pressure generated by the secondary gas generator pushes against the upstream side of the burst diaphragm assembly 16, causing the thin diaphragm 20 to rupture at scribe groove 27 and the central flap portion 25 of the burst diaphragm assembly 16 to swing open as shown in FIG. 5, thereby admitting the gas generated by the secondary solid-propellant gas generator into the manifold.

Although the above description contains many specificities these should not be construed as limiting the scope of the invention, to which variations and improvements may be made without departing from the scope of protection of the present patent and true spirit of the invention, but rather as an exemplification of one preferred embodiment thereof. For example, the thickness of the thin burst diaphragm 20, and that of the relatively thicker back pressure support plate 18, and the depth and shape of the scribe groove 27 and the recess 27, can be determined by those skilled in the art giving due consideration to the properties of the material selected and the specific operating requirements of the application. Accordingly, the scope of the invention should be determined not by the embodiment illustrated, but by the appended claims and their legal equivalents.

That which is claimed is:

1. A burst diaphragm sequence valve made entirely of weldable refractory metal and welded together, comprising:
   a generally cylindrical hollow body having an outlet on one end disposed to be fluidly connected to a gas manifold, and a major and a minor counterbore within an opposite end;
   a generally flat round inlet cap having a central inlet disposed to be fluidly connected to a gas generator, said inlet cap disposed to fit within the major counterbore of said body and to be welded thereto;
   a generally flat round back pressure support plate disposed to fit within the minor counterbore of said body and to be welded thereto, said support plate having a slot cut entirely through the thickness of said plate, the slot generally following the outline of a circle centered on said plate and extending around an arc length of approximately eighty percent of the circumference of the circle, said support plate additionally having on the side of said plate further from said body outlet a straight recess cut partially through the thickness of said plate and bridging the gap between slot ends which extend outwardly normal to and across corresponding ends of the recess; and a thin generally flat round burst diaphragm disposed to fit against the side of said support plate nearer said body outlet and connected to said relatively thicker support plate by two concentric weld circles, the outer weld circle extending out beyond a region occupied by the slot and the recess in said plate, the inner weld circle being to the inside of said region, said burst diaphragm additionally having a semi-circular scribe groove cut into the side nearer said body outlet and extending partially through the thickness of said diaphragm, said groove following the outline of a circular arc lying between said slot and said outer weld circle.

2. A burst diaphragm sequence valve as recited in claim 1 wherein said straight recess is of rectangular cross section.

3. A burst diaphragm sequence valve as recited in claim 1 wherein said scribe groove cross-sectional shape is in the shape of a "V" having a sixty degree total included angle, the bottom of the "V" being flat rather than sharp, the width of the flat bottom being thirty percent of the groove depth.

4. A burst diaphragm sequence valve as recited in claim 2 wherein said scribe groove cross-sectional shape is in the shape of a "V" having a sixty degree total included angle, the bottom of the "V" being flat rather than sharp, the width of the flat bottom being thirty percent of the groove depth.

5. A burst diaphragm sequence valve as recited in claim 3 wherein the depth of said scribe groove is approximately two-thirds of the diaphragm thickness.

6. A burst diaphragm sequence valve as recited in claim 4 wherein the depth of said scribe groove is approximately two-thirds of the diaphragm thickness.

* * * * *